United States Patent [19]

Fujiki et al.

[11] Patent Number: 5,130,398
[45] Date of Patent: Jul. 14, 1992

[54] PREPARATION OF ORGANOPOLYSILOXANE

[75] Inventors: Hironao Fujiki, Takasaki; Nobuhiro Nakagawa, Annaka, both of Japan

[73] Assignee: Shin-Etsu Chemical Company, Limited, Tokyo, Japan

[21] Appl. No.: 757,753

[22] Filed: Sep. 11, 1991

[30] Foreign Application Priority Data

Sep. 12, 1990 [JP] Japan .................... 2-240033

[51] Int. Cl.$^5$ ............................................. C08G 77/06
[52] U.S. Cl. .................................... 528/12; 528/41; 528/34; 528/21; 528/22; 528/23; 528/37; 528/14; 556/462
[58] Field of Search ................ 528/41, 34, 12, 21, 528/22, 23, 37, 14; 556/462

[56] References Cited

U.S. PATENT DOCUMENTS

| 4,719,276 | 1/1988 | Stebleton | 528/24 |
| 4,780,554 | 10/1988 | Quirk et al. | 556/410 |
| 4,888,405 | 12/1989 | Gamon et al. | 528/23 |

Primary Examiner—John C. Bleutge
Assistant Examiner—Margaret W. Glass
Attorney, Agent, or Firm—Millen, White & Zelano

[57] ABSTRACT

Organopolysiloxanes obtained by heating organocyclopolysiloxanes in the presence of alkali catalysts to effect equilibration reaction contain residual silanol groups. The organopolysiloxanes can be stabilized by effecting silylation reaction by adding silylketeneacetal compounds to them, thereby blocking the residual silanol groups through silylation.

5 Claims, No Drawings

PREPARATION OF ORGANOPOLYSILOXANE

This invention relates to a process for preparing an organopolysiloxane, and more particularly, to a process for preparing an organopolysiloxane by effecting equilibration of an organocyclopolysiloxane in the presence of a catalyst, and silylation blocking residual silanol groups of the resulting organopolysiloxane. The blocked organopolysiloxane is stable and of quality so that it is advantageously used as potting agents and adhesives in electric and electronic fields.

BACKGROUND OF THE INVENTION

In the past, organopolysiloxanes were produced by heating organocyclopolysiloxanes in the presence of an alkali catalyst such as sodium hydroxide, potassium hydroxide, cesium hydroxide, tetraalkylphosphonium hydroxides, tetraalkylammonium hydroxides, and silanolates thereof to effect equilibration reaction. During this reaction, silanol groups are usually formed due to the presence of hydroxyl groups or incidental water and left in the organopolysiloxanes in amount of several hundred to several thousand ppm. Since the residual silanol groups are chemically unstable and can adversely affect the heat resistance of organopolysiloxanes, it is desired to block out the silanol groups.

As is well known in the prior art, silylation was often utilized to modify chemically unstable compounds to be stable. For example, alcoholic hydroxyl groups were silylated using trialkylchlorosilanes or hexaalkyldisilazanes. The silylation using trialkylchlorosilanes, however, required to use dehydrochlorinating agents such as tertiary amines and pyridine for removing the hydrogen chloride by-produced upon completion of the reaction whereas the silylation using hexaalkyldisilazanes required the presence of acid catalysts such as trifluoroacetic acid because the reaction rate is so slow that a long time is taken until completion of the reaction. These silylation methods thus required an extra step of removing the dehydrochlorinating agent or acid catalyst.

Therefore, the organopolysiloxanes resulting from equilibration of organocyclopolysiloxanes in the presence of alkali catalysts could be improved in stability through silylation blocking by using trialkylchlorosilanes or hexaalkyldisilazanes for blocking silanol groups of the organopolysiloxanes, but these methods entailed an extra step of removing the dehydrochlorinating agent or acid catalyst at the end of the blocking step by washing the blocked product with water and heating in vacuum for distillation. This added complexity and cumbersome operation to the overall process and the rate of blocking was far from a satisfactory level. The presence of excess acid catalyst could cause undesirable cracking of the organopolysiloxanes.

Japanese Patent Publication No. 12931/1986 discloses silylation carried out in the copresence of a hexaorganosilazane and a triorganochlorosilane. This method of blocking silanol groups of organopolysiloxanes entailed a step of removing the resultant salt by filtration and required an extremely long time until a high viscosity organopolysiloxane was obtained while the blocking rate was less acceptable.

Since salts were essentially formed during silylation by any of the above-mentioned methods, the end product or organopolysiloxane could be contaminated with ionic impurities unless careful control was made during manufacture. Inclusion of such impurities could be a critical drawback for the organopolysiloxanes which were widely used as potting and adhesive agents in electric and electronic fields, leaving a problem to be cleared prior to their commercial application.

As mentioned above, after organopolysiloxanes were produced through equilibration reaction in the presence of alkali catalysts, no prior art methods were successful in silylation blocking residual silanol groups in a commercially advantageous manner.

Therefore, an object of the present invention is to provide a process capable of preparing a stable organopolysiloxane of quality by silylation blocking residual silanol groups in a simple manner at a high blocking rate.

SUMMARY OF THE INVENTION

The inventors have found that by heating an organocyclopolysiloxane in the presence of an alkali catalyst to effect equilibration reaction to produce an organopolysiloxane having residual silanol groups, and subsequently effecting silylation blocking by adding a silylketeneacetal compound having at least one group of the formula:

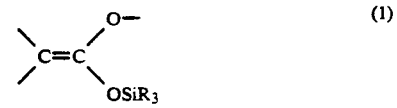
(1)

wherein R is a monovalent organic group in a molecule to the organopolysiloxane, the residual silanol groups of the organopolysiloxane are readily silylated without a catalyst. The process is quite simple because no salt is by-produced and a salt removal step is thus eliminated. There is no possibility of introducing ionic impurities. The rate of blocking residual silanol groups of the organopolysiloxane through silylation is high enough. Therefore, according to the present invention, by blocking residual silanol groups through silylation at a high rate in a simple manner, stable or blocked organopolysiloxanes of quality best suited for use as potting and adhesive agents in electric and electronic fields are obtained in a commercially advantageous manner.

Briefly stated, the present invention provides a process for preparing a blocked organopolysiloxane comprising the steps of: heating an organocyclopolysiloxane in the presence of an alkali catalyst to effect equilibration reaction to produce an organopolysiloxane having residual silanol groups, and effecting silylation blocking by adding a silylketeneacetal compound having at least one group of formula (1) in a molecule to the organopolysiloxane, thereby blocking the silanol group of the organopolysiloxane through silylation.

DETAILED DESCRIPTION OF THE INVENTION

According to the process of the invention, an organopolysiloxane is first prepared by adding an alkali catalyst to an organocyclopolysiloxane and heating the reaction system to effect equilibration reaction.

The starting reactant is an organocyclopolysiloxane which may be represented by the general formula (2).

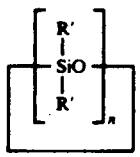

(2)

In formula (2), R' groups are independently selected from a hydrogen atom and a substituted or unsubstituted monovalent hydrocarbon group having 1 to 10 carbon atoms, preferably 1 to 8 carbon atoms, for example, alkyl groups such as methyl, ethyl, propyl, and butyl groups; alkenyl groups such as vinyl, allyl, and butenyl groups; aryl groups such as phenyl and tolyl groups; aralkyl groups such as benzyl and 2-phenylethyl groups; and substituted hydrocarbon groups in which some or all of the hydrogen atoms attached to carbon atoms of these groups are replaced by halogen atoms, cyano groups or the like, such as chloromethyl, chloropropyl, 3,3,3-trifluoropropyl, and 2-cyanoethyl groups. Letter n is an integer of from 3 to 10, preferably equal to 3 or 4.

A polymerization chain stopper such as hexamethyldisiloxane and tetramethyldivinyldisiloxane may be added to the organocyclopolysiloxane for the purpose of controlling the polymerization degree thereof. The amount of the polymerization chain stopper added is properly selected such that the desired polymerization degree may be achieved in accordance with the molar ratio of the R'$_2$SiO unit of the organocyclopolysiloxane to the chain stopper blended.

Examples of the alkali catalyst include sodium hydroxide, potassium hydroxide, cesium hydroxide, tetraalkylphosphonium hydroxides, tetraalkylammonium hydroxides, and silanolates thereof. Preferred alkali catalysts are tetraalkyl(C$_1$-C$_8$)phosphonium hydroxides, tetraalkyl(C$_1$-C$_8$)ammonium hydroxides, and silanolates thereof because these alkali catalyst themselves are decomposed by heating to about 150° C., eliminating a need for removing the catalysts at the end of reaction by adding neutralizing agents. The alkali catalyst is used in a catalystic amount, often of 0.1 to 0.01 mol % per mol of the organocyclopolysiloxane.

The equilibration reaction may take place under ordinary conditions, for example, by heating at 90° to 150° C. for about 2 to about 10 hours.

At the end of equilibration, if necessary, a neutralizing agent may be added to neutralize the remaining alkali catalyst. The neutralizing agents are acids such as tricresyl phosphate and ethylene chlorohydrin, etc.

The second step is to add to the organopolysiloxane resulting from the first step a silylketeneacetal compound having at least one group of the formula (1):

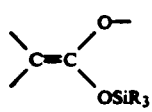

(1)

wherein R is a monovalent organic group in a molecule. Silylation reaction between the residual silanol groups of the organopolysiloxane resulting from the first step and a silylketeneacetal compound is effected.

In formula (1), R is substituted or unsubstituted monovalent hydrocarbon group having 1 to 10 carbon atoms, for example, alkyl groups such as methyl, ethyl, propyl, and butyl groups; alkenyl groups such as vinyl, allyl, and butenyl groups; aryl groups such as phenyl and tolyl groups; aralkyl groups such as benzyl and 2-phenylethyl groups; and substituted hydrocarbon groups in which some or all of the hydrogen atoms are replaced by halogen atoms, such as chloromethyl and 3,3,3-trifluoropropyl groups. R may also be a —OSiR''$_3$ group wherein R'' is a monovalent hydrocarbon group as mentioned just above.

Typical silylketeneacetal compounds are of the following formula (3):

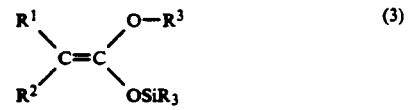

(3)

wherein R$^1$ and R$^2$ each are a hydrogen atom or a substituted or unsubstituted monovalent hydrocarbon group as enumerated for R; and R$^3$ is a substituted or unsubstituted monovalent hydrocarbon group as enumerated for R or a —R$^4$—SiR$^5$$_3$, group wherein R$^4$ is an alkylene group having 1 to 10 carbon atoms and R$^5$ is an alkoxy group having 1 to 6 carbon atoms or a monovalent hydrocarbon group as enumerated for R.

Several illustrative, non-limiting examples of the silylketeneacetal compound are given below.

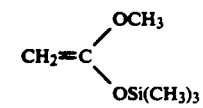

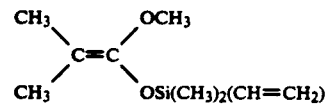

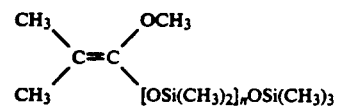

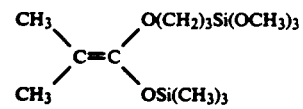

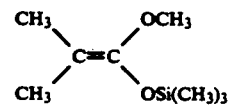

n=an integer of from 1 to 1,000

The silylketeneacetal compounds may be readily synthesized, for example, by reacting a compound of the formula (4):

(4)

with diisopropylaminolithium of the formula:

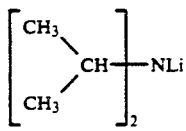

and then reacting the product with a halosilane according to the following reaction scheme.

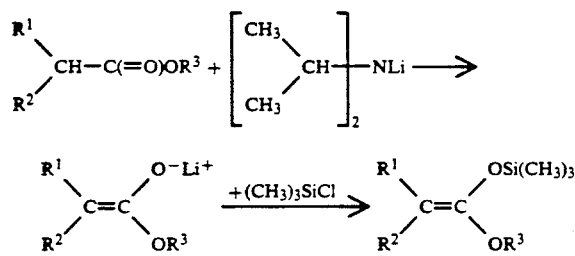

Alternatively, the silylketeneacetal compounds are prepared by adding a hydrogensilane or siloxane to a methacryl ester in the presence of a Wilkinson's complex according to the following reaction scheme.

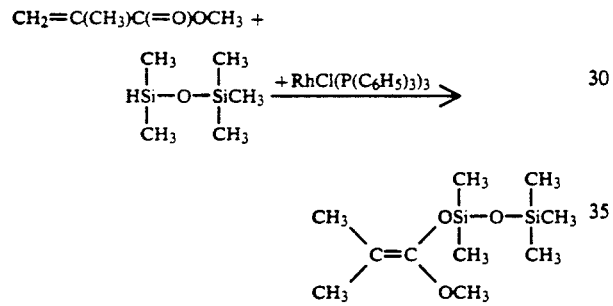

Any desired ones of the methacrylates and hydrogensilanes or siloxanes may be selected in accordance with the intended silylketeneacetal compound.

According to the present invention, the silylketeneacetal compound acts to silylate residual silanol groups of the organopolysiloxane according to the following reaction scheme, with an ester being formed as a by-product.

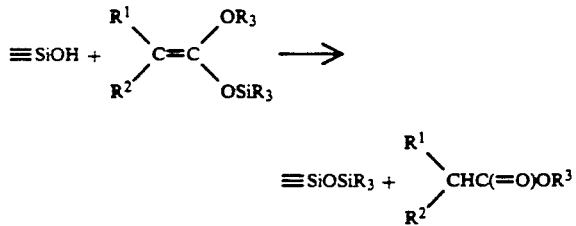

The ester by-product imposes no problem because it can be readily removed during a vacuum heat stripping step conventionally involved in the manufacture of organopolysiloxane and because it is neutral, forms no salt, and leaves no possibility of leaving ionic impurities in the organopolysiloxane.

Silylation of silanol groups with the silylketeneacetal compound can be carried out by adding the silylketeneacetal compound in at least an equimolar amount, preferably 2 to 3 times relative to the theoretical moles of residual silanol groups of the organopolysiloxane resulting from the first step and effecting addition reaction at room temperature to 150° C., preferably at a temperature of 80° to 120° C. Usually, the reaction time is about 1 to about 5 hours.

At the end of silylation, the ester may be stripped off by heating in vacuum in a conventional manner.

According to the present invention, by blocking residual silanol groups through silylation at a high rate in a simple manner, stable or blocked organopolysiloxanes of quality are obtained in a commercially advantageous manner. The organopolysiloxanes thus obtained are free of ionic impurities and best suited for use as potting and adhesive compounds in electric and electronic fields.

EXAMPLE

Examples of the present invention are given below by way of illustration and not by way of limitation.

EXAMPLE 1

To a mixture of 2 grams of 1,3-divinyl-1,1,3,3-tetramethyldisiloxane and 600 grams of octamethylcyclotetrasiloxane was added 0.7 grams of tetrabutylphosphonium hydroxide. Reaction took place at 110° C. for 4 hours. The reaction solution was heated at 150° C. for 2 hours to decompose the catalyst and then neutralized, obtaining a silicone fluid having a viscosity of 30,000 centistokes at 25° C. and a silanol content of 400 ppm.

Next, to 100 grams of the silicone fluid was added 1.2 grams of a compound of the following formula.

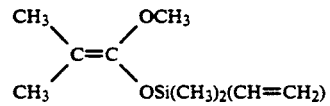

Reaction took place at 100° C. for one hour. Subsequent stripping at 200° C. in a vacuum of 0.1 Torr for 10 hours yielded a clear silicone fluid. It was turbid no longer and had a silanol content of 80 ppm.

EXAMPLE 2

A mixture of 2400 grams of octamethylcyclotetrasiloxane, 2 grams of 1,2,3,4-tetravinyl-1,2,3,4-tetramethylcyclotetrasiloxane, and 6 grams of hexamethyldisiloxane was dried by heating at 110° C. for 2 hours in a nitrogen gas stream, and then cooled down to 80° C. To the mixture was added 1.2 grams of $(C_4H_9)_4POH$. Reaction took place at 140° C. for 16 hours. The reaction solution was heated at 150° C. for 3 hours for deactivating the catalyst, yielding a silicone fluid having a viscosity of 15,000 centipoise at 25° C. and a silanol content of 500 ppm.

Next, to 300 grams of the silicone fluid was added 3 grams of a compound of the following formula.

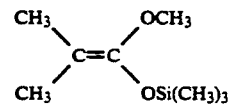

Reaction took place at 100° C. for 1.5 hours. Subsequent stripping at 200° C. in a vacuum of 1 Torr for 10 hours yielded a clear silicone fluid. It was turbid no longer and had a silanol content of 75 ppm.

EXAMPLE 3

A mixture of 140 grams of octaphenylcyclotetrasiloxane and 1700 grams of octamethylcyclotetrasiloxane was dried by heating at 110° C. for 2 hours in a nitrogen gas stream, and then cooled down to 80° C. To the mixture were added 6 grams of divinyltetramethyldisiloxane and 2.2 grams of $(C_4H_9)_4POH$. Reaction took place at 150° C. for 20 hours. The reaction solution was heated at 140° C. for 3 hours for deactivating the catalyst, yielding a silicone fluid having a viscosity of 20,000 centipoise at 25° C. and a silanol content of 500 ppm.

Next, to 2000 grams of the silicone fluid was added 20 grams of a compound of the following formula.

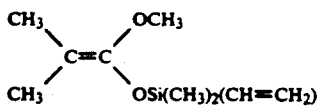

Reaction took place at 100° C. for 3 hours. Subsequent stripping at 200° C. in a vacuum of 0.1 Torr for 15 hours yielded at clear silicone fluid. It was turbid no longer and had a silanol content of 120 ppm.

Although some preferred embodiments have been described, many modifications and variations may be made thereto in the light of the above teachings. It is therefore to be understood that within the scope of the appended claims, the invention may be practiced otherwise than as specifically described.

We claim:

1. A process for preparing an organopolysiloxane comprising the steps of:

heating an organocyclopolysiloxane in the presence of an alkali catalyst to effect equilibration reaction to produce an organopolysiloxane having residual silanol groups, and effecting silylation reaction by adding a silylketeneacetal compound having at least one group of the formula:

wherein R is a monovalent organic group in a molecule to said organopolysiloxane, thereby blocking the silanol groups of said organopolysiloxane through silylation.

2. The process of claim 1 wherein R is a substituted or unsubstituted monovalent hydrocarbon group having 1 to 10 carbon atoms.

3. The process of claim 2 wherein R is selected from the group consisting of an alkyl, alkenyl, aryl, and aralkyl group, and a substituted hydrocarbon group in which some or all of the hydrogen atoms are replaced by halogen atoms.

4. The process of claim 1 wherein R is a $-OSiR''_3$ group wherein R'' is a monovalent hydrocarbon group having 1 to 10 carbon atoms.

5. The process of claim 1 wherein the silylketeneacetal compound is added in at least an equimolar amount relative to the theoretical moles of residual silanol groups of the organopolysiloxane resulting from the first step.

* * * * *